T. E. McDONALD.
Cultivator.
No. 84,430.
Patented Nov. 24, 1868.
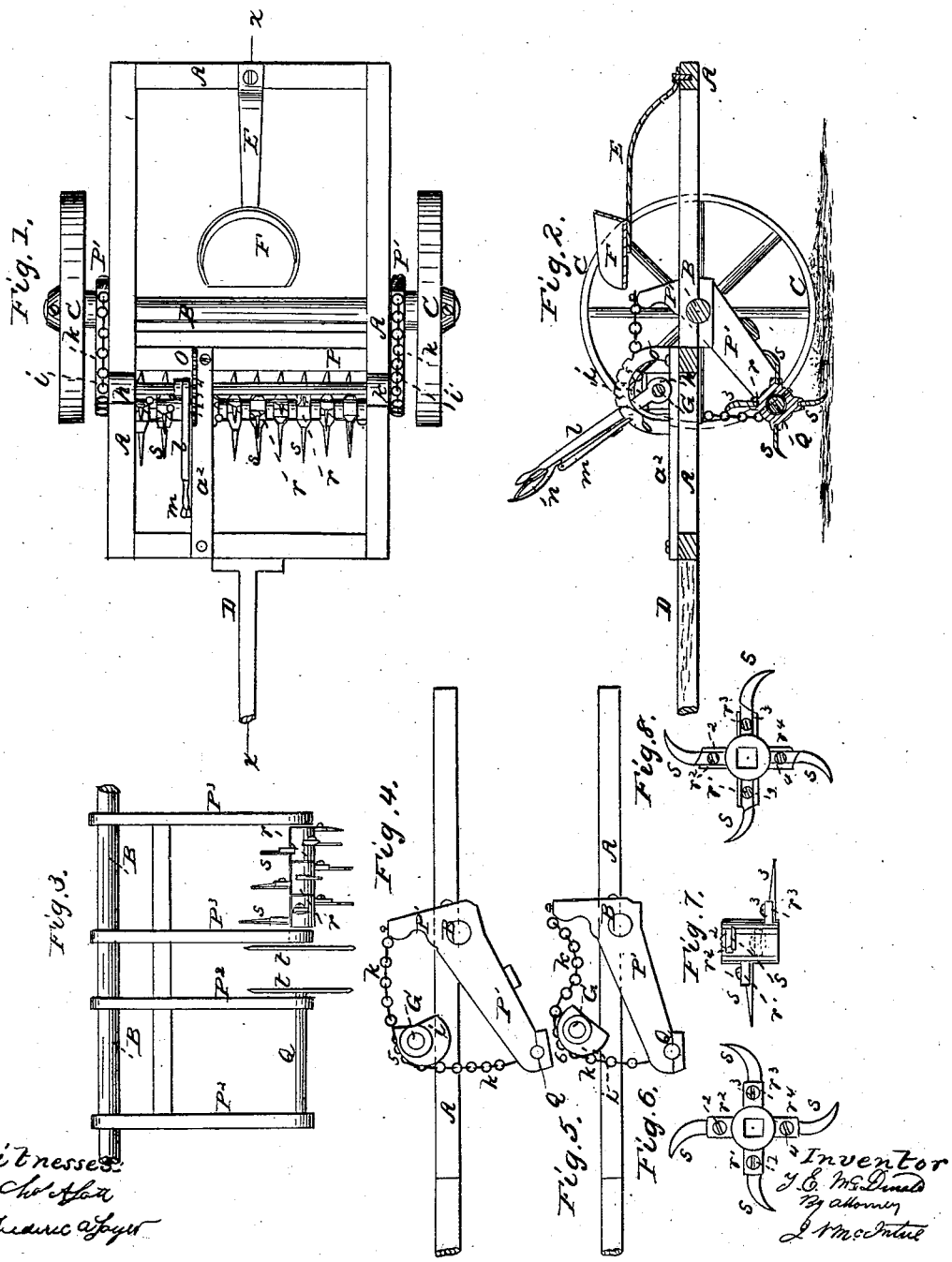

THOMAS E. McDONALD, OF NEW BRUNSWICK, NEW JERSEY, ASSIGNOR TO P. P. RUNYON, JOHNSON LETSON, AND GEORGE J. JANEWAY, OF SAME PLACE.

Letters Patent No. 84,430, dated November 24, 1868.

IMPROVEMENT IN CULTIVATORS.

The Schedule referred to in these Letters Patent and making part of the same.

*To all whom it may concern:*

Be it known that I, THOMAS E. McDONALD, of New Brunswick, of Middlesex county, in the State of New Jersey, have invented certain new and useful "Improvements in Cultivators;" and I do hereby declare that the following is a full and exact description thereof, reference being had to the accompanying drawings, making part of this application.

My invention relates particularly to that class of cultivators in which a series of teeth is employed, which are arranged on a rotatory shaft, and dig into the surface of the ground as the machine travels along, and which are adapted to dig into the surface of the ground to a given extent, according to the adjustment of the machine.

Previous to my invention, this class of cultivator-machines has been so constructed that the rotatory shaft on which the cutting-teeth or knives were arranged has been driven by gearing, actuated from the main axle or wheels of the machine, so that an arbitrary rotary motion has been imparted, of a uniform velocity compared with the progressive motion of the machine. In this mode of construction and operation, not only considerable expense of manufacture has arisen, but the machines required have been of very heavy draught, that is to say, great power has been required to make them perform the desired work.

My invention has for one of its objects to simplify this class of machines, and at the same time render them capable of performing the same work more effectually, with very much less expenditure of power, (or less draught;) and to these ends, The first part of my invention consists in dispensing with all driving-gearing (or other driving-mechanism) in connection with the cultivator-shaft, and hanging the shaft, to which the teeth are attached, so as to rotate freely in the forward end of a hinged frame, and in such manner that as the machine is drawn along, the said cultivator will be rotated merely by the contact of its teeth with the ground, as will be hereinafter more fully explained.

Another objection in machines heretofore made, in which a rotary cultivator has been used in connection with a swinging frame and main carriage-frame, has been the liability of the rotary cultivator to lift or ride over, instead of penetrating, when the machine passed over a piece of hard ground. This difficulty I propose to overcome by means of a suitable mechanism or device for locking down the swinging frame in which the cultivator-shaft is hung, so that the teeth cannot ride over the surface, but must penetrate to the desired extent, or lift the entire machine from the ground, as will be hereinafter more fully described; and this constitutes the second part of my invention.

Previous to my invention, it has been customary to arrange the teeth spirally on the shaft, as shown, for instance, in the patent granted, July 16, 1868, to D. D. Stelle; but in all this class of machines, previous to my invention, the teeth of each hub, or each set of teeth, have been arranged in the same plane.

The third part of my invention consists in arranging each set of teeth spirally, as will be hereinafter more fully explained, whereby each and every tooth is made to travel in a different path, and the entire surface of the ground is more thoroughly disintegrated.

My invention consists, fourthly, in a novel method of construction and arrangement together of the hubs and arms into which the cultivator-teeth are set and secured, as will be presently more fully explained.

It has been suggested heretofore to so construct a cultivator-machine that one or more of the sets of teeth on the rotatory shaft could be displaced, so as to permit the remainder to work up the ground on each side of and in close proximity to a row of young plants; but since the teeth are necessarily comparatively short, and have to penetrate some distance into the ground, it has been found that the shaft would be in the way, and prevent the successful working of the machines for this purpose. I have overcome this difficulty, and rendered this class of machines capable of cultivating close up on both sides at once to a row of young plants, by dividing the cultivator-shaft so as to straddle the row of plants, as will be hereinafter fully described; and this constitutes the fifth part of my invention.

To enable those skilled in the art to make and use my invention, I will proceed to describe one of my improved machines, referring by letters to the accompanying drawings, in which—

Figure 1 is a top view of one of my improved machines;

Figure 2 is a vertical longitudinal section at *xx*, fig. 1;

Figure 3 is a partial top elevation, illustrating the divided shaft;

Figures 4 and 5 are skeleton views, illustrating the construction and operation of the swing-frame and its retaining-mechanism; and Figures 6, 7, and 8 are detail views of one of the hubs and its teeth.

In the several figures, the same parts will be found designated by the same letter of reference.

A is the main frame of the machine, which is mounted on an axle, B, provided with a pair of ground-wheels, C C, and which is also provided with the usual pole, D, to which the draught-team is hitched.

On the rear of the frame A is bolted a spring-arm, E, which extends forward and upward, as shown, and which supports the driver's seat, F, centrally over the main frame and axle of the machine.

G is a rock-shaft, which turns freely in bearings, formed in the stands or small pillow-blocks *h h*, which project upward on top at either side of the main frame A. On the ends of said shaft G are secured small pulleys, or segments of pulleys, *i i*, over which pass chains *k k*, for purposes to be presently explained; and arranged on the body of said shaft G, at such a point as to be within convenient reach of the driver as he sits in seat F, is secured a handle or lever, $l$, by means of which said shaft G may be rocked in its bearings.

$m$ is a bolt or latch-bar, which is pivoted to the lever $l$, is held in place by a spring, $n$, and catches into the notches 1, 2, 3, &c., of the arc $o$, for the purpose of locking or retaining the lever $l$ and its rock-shaft G in certain positions.

The arc $o$ is fast to a cross-bar, $a^2$, of the machine-frame.

P $P^1$ is a vibratory or hinged frame, (composed, as shown, of two arms $P^1$ and a cross-bar, P,) which is pivoted or hung, near its upper rear end, to the main axle B, and in the lower extremities of which is hung, so as to turn freely, the cultivator-shaft Q.

On this shaft is arranged and secured a number of hubs, $r$, provided with teeth, $s$, the whole series being arranged so as to run spirally around the shaft, and radiate from it.

The frame P $P^1$, carrying the cultivator, is vibrated into different positions by means of the chains $k$, which, in turn, are moved by the pulleys $i\ i$, to which they are attached by means of screws or pins, 5 6, passing through the links of said chains, and into the faces of said pulleys.

I have shown a simple continuous shaft at figs. 1 and 2, to prevent complication of the drawings, but I propose to employ a divide shaft and double frame, $P^2\ P^3$, such as seen at fig. 3.

In this figure, I have shown the shaft made square, and provided with disks or shields, $t\ t$, which are intended to shield the young plants, on either side of which they pass along, as a row of plants is straddled, and the ground cultivated up each side.

I propose to make the hubs $r$, as seen at figs. 6, 7, and 8, with radial arms, $r^1\ r^2\ r^3\ r^4$, into which are inserted and secured, by means of set-screws or bolts, 1 2 3 4, the teeth $s$.

These arms $r^1$, &c., it will be seen, are cast or formed with rebates or depressions on one side or face, into which fit the shanks or roots of the teeth $s$, in such a manner that when placed in position, and fastened by the single screw 1, each tooth, $s$, is firmly braced and held in place.

The arms $r^1$, &c., it will be observed, are so arranged on the hub as to run spirally around it; that is to say, one arm is set close to one edge or end of the hub, the next nearer the middle, the next beyond the middle, and the fourth close to the opposite side or end of said hub.

The object and advantage of this arrangement of the arms $r^1$, &c., and their teeth, are to cause each tooth to travel in a different path, and thus effect a more thorough pulverization of the ground or soil. Of course the series of hubs is set spirally on the shaft Q, so that the whole set of teeth run spirally around said shaft, thus constituting as it were a double spiral arrangement of teeth.

In the skeleton views, 4 and 5, I have shown the swinging frame P $P^1$ in two different positions—at fig. 4, depressed at its forward end, to its limit, and in fig. 5, elevated.

It will be seen that when the cultivator is thrown down, as at fig. 4, the chains $k$ are stretched tight, and in this condition of the mechanism, with the shaft G firmly held in position by means of its lever $l$, being locked fast to the arc $o$.

It will be seen the cultivator is rigidly held down to its work, and is only free to rotate, so that as the machine is drawn along, the teeth of the cultivator are forced to enter the soil to the required depth.

When the cultivator is raised up, as seen at fig. 5, that portion of the chain $k$ extending from the pulley $i$ to the standard $w$ is slack, and at intermediate points between the extremes, illustrated at figs. 4 and 5, the cultivator is partially held down by the chains.

The general operation of the machine will be readily understood.

The machine being provided with a team, the driver, seated at F, readily and conveniently drives, and at the same time manipulates the handle or lever $l$, by means of which the cultivator is adjusted or entirely lifted from the ground, and locked up, when the machine is turning, or not working in the soil.

It will be understood that by the employment of simply a hinged frame, with the rotary cultivator hung at its lower forward end, and pivoted at its upper rear end, without any gearing, the tendency of the cultivator will be to bite or crowd into the surface always, and that while the machine thus constructed will be exceedingly effectual, it will require only about one-third the power for the same work, and will be free of the weight, expense, and complication of all gearing.

And it will be seen that by means of the divided shaft, and shields, the driver can straddle and drive along over a row of young corn, or other plants, and conveniently cultivate close up to the stalks, while harrowing or pulverizing the soil in the spaces between the rows of plants.

The arms of the teeth-hubs being all cast from the same pattern, and the shanks of the teeth being manufactured all alike, there is no difficulty in replacing a broken tooth with a new one by any farmer unskilled in mechanics; and the manufacture and putting together of the parts of machines are rendered economic by my improved method of constructing and connecting the teeth and hubs.

Having fully explained my invention, so that those skilled in the art can make and use my improved machine, and wishing it to be understood that the separate features of my invention may be used, without combining them all in one machine, with more or less advantage, and not wishing to be limited to any precise form or detail construction of the devices,

What I claim as new, and desire to secure by Letters Patent, is—

1. A machine, having a series of cultivator-teeth, arranged on a rotatory shaft, in combination with a swinging or hinged frame, pivoted in rear of the cultivator, when the latter is operated by its progressing over and in contact with the ground, substantially as described.

2. The employment, in combination with the cultivator, hinged frame, of the chains, or their equivalent, and a suitable moving and holding-mechanism for retaining the adjustable frame while the cultivator is at work, substantially as and for the purpose set forth.

3. Arranging the teeth on each hub, or each set of teeth, spirally, as and for the purpose specified 4. Method, shown and described, of constructing and combining the teeth and their retaining-arms and hubs.

5. A divided cultivator-shaft, whereby the machine is rendered capable of straddling a row of plants, and cultivating each side, as hereinbefore set forth.

In testimony whereof, I have hereunto set my hand and seal, this 24th day of September, 1868.

THOMAS E. McDONALD. [L. S.]

Witnesses:
 CHARLES A. SCOTT,
 J. N. McINTIRE.